Sept. 2, 1952 — H. S. HERSEY — 2,609,084
SELF-ALIGNING BELT IDLER
Filed Sept. 23, 1950

INVENTOR.
HERBERT S. HERSEY
BY
Oberlin & Limbach
ATTORNEYS

Patented Sept. 2, 1952

2,609,084

UNITED STATES PATENT OFFICE 2,609,084

SELF-ALIGNING BELT IDLER

Herbert S. Hersey, Cleveland, Ohio, assignor to
The C. O. Bartlett & Snow Co., Cleveland, Ohio,
a corporation of Ohio Application September 23, 1950, Serial No. 186,376

7 Claims. (Cl. 198—202)

This invention relates as indicated to a method for training and automatically aligning conveyor belts.

Due to unequal loading and other causes, conveyor belts have a considerable tendency to deviate laterally from their intended paths, thereby either running off of their idler pulleys or causing excessive wear of the belt edges due to the belt rubbing against restraining devices.

In order to train a belt to run straight, some skewing of a "flat" pulley must be accomplished. By "flat" is meant a cylindrical pulley rotating on a horizontal shaft, the pulley contacting the belt undersurface for the length of the pulley. When this pulley is so skewed, the belt will tend to move sideways as a box will when supported on skewed parallel rollers. A troughing idler consists of a "flat" pulley in the center and additional pulleys on each side of and in axial line with the "flat" pulley, but independently rotating about axes inclined to the horizontal. In a return idler, the whole idler pulley is of the "flat" type. These aforementioned pulleys need not be of the so-called idler type, but may also be power driven when this is expedient.

Many restraining devices are well known in the art for keeping a belt on its pulleys, including stationary curbs, channels, and fixed guide rollers of various shapes and sizes. One established practice is to provide vertically or horizontally disposed auxiliary pulleys at the edges of the belt to prevent such lateral movement. These vertical or horizontal guide pulleys, however, do not remove the tendency towards lateral movement, but merely act as stops which hold this transverse movement within limits.

Now, if the sideward run-out of the belt can be made to generate a force to rotate the entire idler assembly about a central pivot, thereby skewing the "flat" pulley portion of the idler sufficiently, the skewed "flat" pulley portion in contact with the belt will gradually move the belt back to its original position, or even sideward the other way.

If the forces causing the unbalance of the conveyor belt are greater than the corrective force due to skewing the idler rolls, the belt will continue its tendency to shift laterally. If, on the other hand, the skewing action of the idler rollers more than overcome the forces of unbalance, this will cause overcompensation and the belt will shift too far laterally to the opposite side of its intended run. Thus, skewed idler rollers which undercompensate the forces of unbalance do not stop a transverse shift of the belt, and will not return the belt to its intended run. Skewed idler rollers which overcompensate the forces of unbalance acting on the belt will cause the belt to shift back in the opposite direction laterally beyond the area of normal operation. If this runout is in turn overcorrected, the eventual result is a lateral shifting of the belt from side to side. This transverse, horizontal, oscillating motion in conveyor belts is, of course, very undesirable and must be reduced to an absolute minimum by some belt training device if the conveyor belts are to be operated efficiently.

Of methods well-known in the art for training belts, many use the aforementioned skewing principle on idler pulleys which are cradled so as to freely turn about a vertical axis by means of a cradle pivot centrally disposed beneath the cradle. One such device still in use employs vertically disposed cylindrical actuating rollers running on anti-friction bearings. These actuating rollers are at the extremities of arms on each side of, and parallel to the belt, mounted on the troughing idler cradle and extending in the direction of the approaching belt. When the belt moves transversely, the edge of the belt squarely hits the cylindrical surface of the actuating roller. This sideward pressure of the belt against the roller is transmitted through the roller supporting arm to the pivoted cradle, causing the cradle to pivot and thus guide the belt back to a normal position. The device will not operate, however, on a reversing belt since the skewing resulting from these rollers on the side of the cradle opposite that of the approaching belt would tend to aggravate the transverse displacement of the belt rather than to correct it. This device is further objectionable because transverse "overtravel" on the actuating rollers causes harmful belt wear.

Another such device well known to the art uses free revolving counterweighted narrow face-and larger-special end rollers beyond the normal cylindrical inclined roller of the troughing idler. Being on the same shaft, these actuating rollers are co-incident with the plane of the idler roller centers. The narrow face rollers are mounted on anti-friction bearings but are eccentrically weighted so that they do not revolve easily but rather tend to slip. When the belt moves transversely, the belt edge touching the narrow face roller slips against it until the eccentric weight of the narrow face roller is overcome. During the slipping period, there is a force tending to skew the whole idler, and hence train the belt back in line. In many cases the use of this device is objectionable in that there is no progressive force tending to swing the idler. The counterweight of the actuating roller produces just so much slip on the belt and no more.

A third example of a belt training device in current use is also adapted to be mounted on an idler pulley cradle which freely turns about a vertical axis by means of a cradle pivot centrally disposed beneath the cradle. A cylindrical idler roller running on anti-friction ball bearings is supported by this cradle for rotation about an axis angularly related to the plane of the adjacent marginal portion of the belt. If the belt shifts transversely sufficiently, the belt edge will contact this roller causing it to rotate. However, the same force of the belt edge which causes the roller to rotate also causes a brake shoe to engage the undersurface of the adjacent troughing idler pulley. This causes the belt to slide over the inclined pulley, thereby increasing belt friction with the pulley and thus causing the whole idler to swing on its pivot. However, when wear occurs on the brake shoes, the belt may not get enough training action to cause it to return, hence it may slide up over the actuating idler roller. Although the top of the roller is rounded so that no injury results to the belt from this source, before such action occurs, the edge of the belt is subject to high pressure and wear, almost as though a regular fixed guide roller were used.

Unlike my invention, which works equally well on troughing idlers and return idlers, this device will not work on a one-piece return idler since any braking of this roll will cause the entire width of the belt to slide, which, of course, would not produce the necessary corrective skewing action. Furthermore, as opposed to this self-aligning idler, in which the efficiency decreases as the wear of the brake shoe increases, in my invention even an appreciable amount of wear will not reduce the belt training efficiency.

The principal objects of my invention, therefore, are to provide in a new and unusual manner actuating rollers in the plane of the troughing idler pulley centers, which will give identical action for either direction of belt travel, provide for a progressively increasing force proportionate to the lateral displacement of the belt, which will skew the idler roller just enough to return the belt to its normal position of travel, and provide for protection against belt wear not only in cases of belt over-travel but also during normal belt contact with the actuating roller.

Other objects and advantages of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
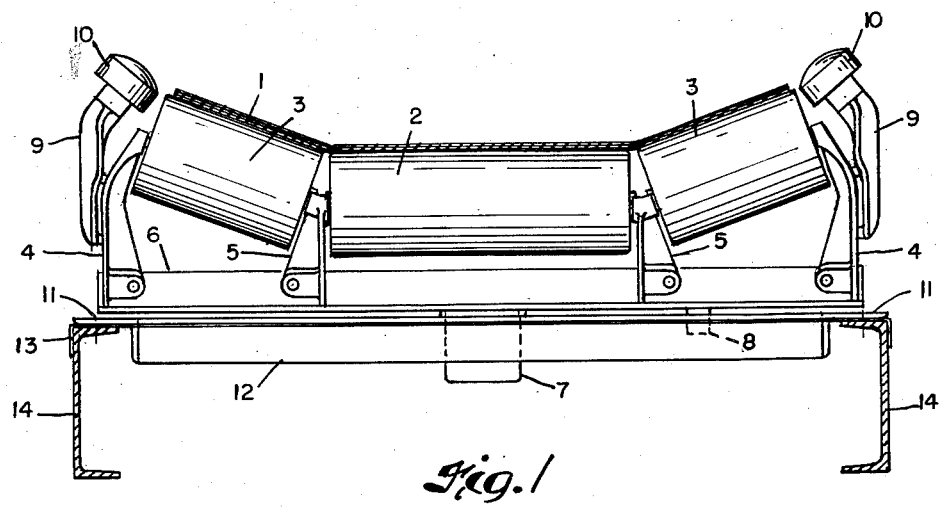
Fig. 1 is a cross-sectional view of a conveyor belt, mounted on a troughing idler of the character previously referred to and in conjunction with my invention illustrating how it may be advantageously employed.

Referring now more specifically to the drawing and more especially to Fig. 1, the apparatus here illustrated comprises an endless conveyor belt 1, running on a troughing idler comprised of troughing idler rollers 2 and 3, which are supported by a troughing idler cradle integrally composed of vertical stands 4 and 5, and a horizontal base support 6. Horizontal base support 6 is fastened to an idler pivot device 7. The degree of horizontal rotation of the troughing idler cradle is limited by stop lugs indicated by 8. Mounted on vertical stands 4 are auxiliary idler roller supports 9 which hold and position dome-shaped auxiliary rollers 10.

Idler pivot 7, upon which the entire above-described assembly rests, is supported by a suitable frame consisting, for illustrative purposes, of the following structural members; angles 11 and 12, plate 13, and channels 14. Idler pivot 7 may be mounted on anti-friction bearings so as to reduce to a minimum frictional resistance to skewing.

There may be provided a plurality of idler rollers as a means of supporting the upper run of the belt, such rollers being spaced at intervals sufficiently close so that there is no appreciable sagging of the upper run of the belt. In this connection, it should be noted that the construction of the belt itself, the supporting and driving means therefor, form no part of the present invention, and since they are all of standard construction, well-known to those familiar with the art, a more detailed explanation thereof will not be given.

Figure 2:
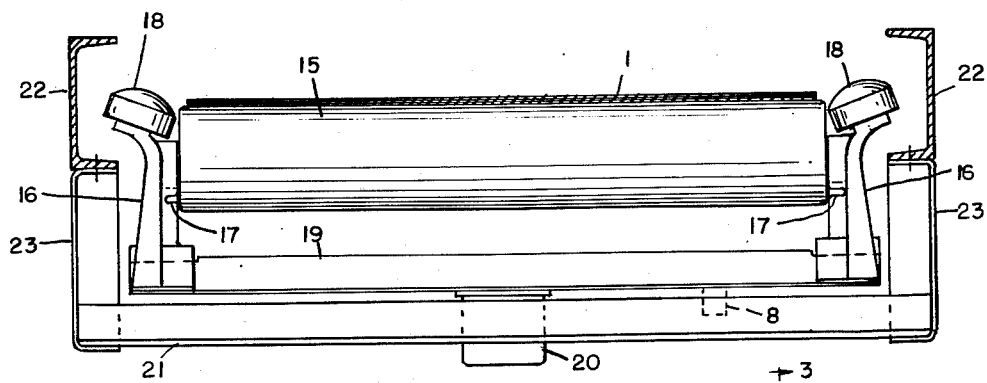
Fig. 2 is a cross-sectional view of a conveyor belt mounted on a return idler roller showing how my invention may be advantageously employed with the aforementioned return idler roller.

The conveyor belt mentioned in Fig. 1 above is carried on its return run over a "return idler" illustrated in Fig. 2, and comprising a return idler roller 15, supported by vertical stands 16, in which are located adaptor blocks 17. Vertical stands 16 also support and position auxiliary idler rollers 18. Supporting the above-described return idler is a horizontal base support 19 which is attached to and supported by idler pivot 20. Idler pivot 20 is suitably mounted in a frame comprising such structural members as angles 21 and channels 22 and 23, so arranged as to give the lower run of the conveyor belt adequate support, strength and rigidity.

Figure 3:
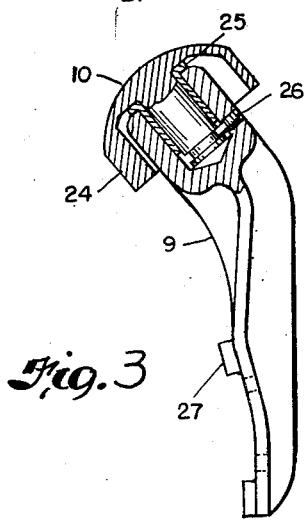
Fig. 3 is a fragmentary cross section view of Fig. 4 along lines 3—3 illustrating one possible method of assembly.
Figure 4:
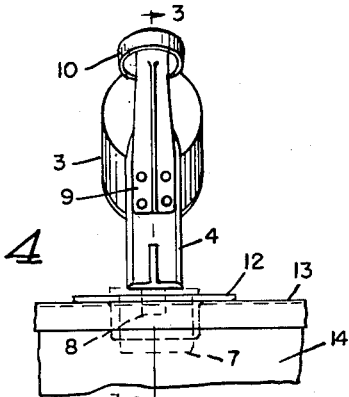
Fig. 4 is a side elevation of Fig. 1.

Fig. 3 is a section view of Fig. 4 taken at line 3—3 showing an assembly of the auxiliary idler roller supports 9 with the auxiliary idler rollers 10. To increase resistance to turning, auxiliary idler roller 10 may be eccentrically weighted as shown at 24, although this is not necessary for satisfactory functioning of the mechanism. The auxiliary idler rollers 10 are journaled in bushings 25. Just enough journal friction to create the proper force for operation of this mechanism, as will be presently explained, can be obtained by using sintered, oil-soaked bushings, such as Oilite, Gramix, or Metwel. Under certain operating conditions, however, a more satisfactory journal friction can be obtained by making the actuating rollers of bronze or brass and eliminating the oil-soaked sintered bushings. Under other operating conditions, for instance, where experience indicates that conditions of unbalance will be slight, the auxiliary idler rollers 10 and 18 may be mounted on anti-friction bearings for best results both in belt training and in reduction of belt wear. Auxiliary idler roller 10 and bushing 25 are fastened in auxiliary idler support 9 by a screw 26. Bosses 27 are provided in order to facilitate mounting of idler roller supports 9 on vertical stands 4 shown in Fig. 1.

Referring back to Fig. 1, as conveyor belt 1 moves over troughing idler rollers 2 and 3, an unbalanced load on the conveyor belt 1 may cause the belt to creep laterally either to the right or to the left. In either event, as the lateral displacement increases, the belt edge on one side of the conveyor belt 1 will contact the dome-shaped auxiliary idler roller mounted on that side of the conveyor. Contact of the belt edge with the edge of the domed surface of the auxiliary idler roller 10 will cause the auxiliary idler roller to revolve. The pressure of the belt 1 against the auxiliary idler roller 10, with the moment arm measured from the point of contact of the belt 1 to the axis of the auxiliary idler roller 10 causes a force to be exerted on the troughing idler in the direction of travel of the belt 1. This force is translated into a torsional force about idler pivot 7, resulting in a skewing of the troughing idler so as to resist further lateral creep of the belt 1. If the skewing of the troughing idler caused by the above-described chain of forces is not sufficient to stop the lateral creep of the belt 1, as this sideward travel continues the belt 1 will move up higher on the dome of auxiliary idler roller 10. This decreases the length of the moment arm above-described, thereby requiring greater force to revolve the auxiliary idler roller 10 and at the same time necessitating auxiliary idler roller 10 to accelerate due to the decreased circumference of the contact circle of the auxiliary idler roller dome with the belt edge of the conveyor belt 1. This increased force required to revolve auxiliary idler roller 10 is in turn translated into a greater torsional effort about the axis of idler pivot 7, thereby skewing the troughing idler even more and thus increasing the corrective action of the troughing idler on the sideward travel of the belt 1.

If the condition of unbalance on the conveyor belt 1 is very great, the belt may continue to move up on the domed surface of the auxiliary idler roller 10 until the belt is finally sliding over the top of the auxiliary idler roller 10. This condition causes a maximum skewing force on the troughing idler resulting in a maximum amount of corrective action on the belt 1 by the troughing idler, and is usually sufficient to correct all but the most extreme cases of conveyor belt unbalance. At positions along the conveyor of extreme unbalance the auxiliary idler rollers 10 may be locked against rotation thereby offering maximum resistance to the motion of the belt thus effecting a greater corrective action on the belt at once, and before a condition of transverse deviation becomes unmanageable. As the belt 1 is gradually returned to its normal position of travel, the corrective forces on the belt diminish proportionately, until they are zero when the belt is back on its intended run, thereby eliminating any possibility of over-compensating the lateral travel of the belt, causing it to overshift in the opposite direction.

In Fig. 2 the operation of the self-aligning belt auxiliary idler roller 18 on belt 1, running over return idler roller 15 is essentially the same as that described above in Fig. 1.

From the foregoing description, it will be observed that I have provided self-aligning, belt training auxiliary idler rollers 10 and 18, which, because of the strategic location of their dome shaped surfaces, provide in a manner new to the art a means of converting the forces of unbalance operating on a conveyor belt 1 into a compensating force which is directed to correct undesirable conditions of transverse belt travel in direct proportion to the transverse displacement of the belt. This device is equally effective on reversing belts since the action is identical for either direction of belt travel. In addition, self-aligning, belt training, auxiliary idler rollers 10 and 18, because of the location of their domed surfaces, have the additional feature of reducing frictional wear and damage to the belt edge and undersurface of the conveyor belt 1, not only when the belt "over travels" but at all times while the belt is in contact with said self-aligning belt auxiliary idler rollers. Thus, my invention, although simpler than commensurate prior art has all of the effectiveness of the old belt training devices discussed above without at the same time having an embodiment of their objectionable weaknesses.

Other modes of applying the principle of the invention may be employed, change being made as regards the details described, provided the features stated in any of the following claims or the equivalent of such be employed.

I, therefore, particularly point out and distinctly claim as my invention:

1. A conveyor belt training device comprising the combination with a belt supporting cradle having a rotatably supported roller engaging the under face of the belt, means pivotally supporting said cradle on a vertical axis substantially centrally of the belt area, of an auxiliary roller, supported by said cradle for rotation about an axis angularly related to the plane of such marginal portion of the belt, said auxiliary roller having a dome-shaped head and being so positioned that the plane of such marginal portion of the belt intersects the roller on such dome-shaped head, whereby as the edge of the belt moves upwardly on the dome-shaped head of the auxiliary roller, rolling contact between the belt and auxiliary roller results in a progressive increase in the speed of the auxiliary roller and as the edge of the belt goes beyond the crown of the auxiliary roller the latter will exert a frictional drag on the belt.

2. A conveyor belt training device comprising the combination with a belt supporting cradle having a rotatably supported roller engaging the under face of the belt, means pivotally supporting said cradle on a vertical axis substantially centrally of the belt area, of an auxiliary roller, supported by said cradle for rotation about an axis angularly related to the plane of the adjacent marginal portion of the belt, said auxiliary roller having an upwardly extending dome-shaped head and being so positioned that the plane of such marginal portion of the belt intersects the roller on such dome-shaped head, whereby as the edge of the belt moves upwardly on the dome-shaped head of the auxiliary roller, rolling contact between the belt and auxiliary roller results in a progressive increase in the speed of the auxiliary roller and as the edge of the belt goes beyond the crown of the auxiliary roller the latter will exert a frictional drag on the belt.

3. A conveyor belt training device comprising the combination with a belt supporting cradle having rotatably supported rollers engaging the under face of the belt, means pivotally supporting said cradle on a vertical axis substantially centrally of the belt area, of a pair of auxiliary rollers, supported on said cradle on opposite sides for rotation about axes angularly related to the planes of the adjacent marginal portions of the belt, said auxiliary rollers having dome-shaped heads and being so positioned that the planes of such marginal portions of the belt respectively intersect the adjacent auxiliary rollers on such dome-shaped heads, whereby as the edge of the belt moves upwardly on the dome-shaped head of the auxiliary roller, rolling contact between the belt and auxiliary roller results in a progressive increase in the speed of the auxiliary roller and as the edge of the belt goes beyond the crown of the auxiliary roller the latter will exert a frictional drag on the belt.

4. A conveyor belt training device comprising the combination with a belt supporting cradle having rotatably supported rollers engaging the under face of the belt, means pivotally supporting said cradle on a vertical axis substantially centrally of the belt area, of an auxiliary roller, supported for rotation about an axis angularly related to the plane of the adjacent marginal portion of the belt by an arm detachably secured to said cradle, said roller having a dome-shaped head and being so positioned that the plane of such marginal portion of the belt intersects the roller on such dome-shaped head, whereby as the edge of the belt moves upwardly on the dome-shaped head of the auxiliary roller, rolling contact between the belt and auxiliary roller results in a progressive increase in the speed of the auxiliary roller and as the edge of the belt goes beyond the crown of the auxiliary roller the latter will exert a frictional drag on the belt.

5. A conveyor belt training device comprising the combination with a belt supporting cradle having rotatably supported rollers engaging the under face of the belt, means pivotally supporting said cradle on a vertical axis substantially centrally of the belt area, of an eccentrically weighted auxiliary roller, supported for rotation about an axis angularly related to the plane of the adjacent marginal portion of the belt by an arm detachably secured to said cradle, said roller having a dome-shaped head and being so positioned that the plane of such marginal portion of the belt intersects the roller on such dome-shaped head, whereby as the edge of the belt moves upwardly on the dome-shaped head of the auxiliary roller, rolling contact between the belt and auxiliary roller results in a progressive increase in the speed of the auxiliary roller and as the edge of the belt goes beyond the crown of the auxiliary roller the latter will exert a frictional drag on the belt.

6. A conveyor belt training device comprising the combination with a belt supporting cradle having rotatably supported rollers engaging the face of the belt, means pivotally supporting said cradle on a vertical axis substantially centrally of the belt area, of an auxiliary member having a dome-shaped head, and with the longitudinal axis of such member angularly related to the plane of the adjacent marginal portion of the belt, said member being supported by said cradle and being so positioned that the plane of such marginal portion of the belt intersects the member on such dome-shaped head, whereby as the edge of the belt moves upwardly on the dome-shaped head of the auxiliary member, rolling contact between the belt and auxiliary member results in a progressive increase in the speed of the auxiliary member and as the edge of the belt goes beyond the crown of the auxiliary member the latter will exert a frictional drag on the belt.

7. A conveyor belt training device comprising the combination with a belt supporting cradle having rotatably supported rollers engaging the face of the belt, means pivotally supporting said cradle on a vertical axis substantially centrally of the belt area, of an auxiliary member mounted on said cradle, the top surface of such member being so inclined toward such conveyor belt that the plane of the adjacent marginal portion of the belt intersects said member on such inclined surface, whereby as the edge of the belt moves upwardly on the dome-shaped head of the auxiliary member, rolling contact between the belt and auxiliary member results in a progressive increase in the speed of the auxiliary member and as the edge of the belt goes beyond the crown of the auxiliary member the latter will exert a frictional drag on the belt.

HERBERT S. HERSEY.

REFERENCES CITED

The following references are of record in the file of this patent:

UNITED STATES PATENTS

| Number | Name | Date |
| --- | --- | --- |
| 2,012,089 | Sayers | Aug. 20, 1935 |
| 2,109,923 | Lemmon | Mar. 1, 1938 |